United States Patent
Lettmann et al.

(10) Patent No.: US 6,946,515 B1
(45) Date of Patent: Sep. 20, 2005

(54) COATING SUBSTANCE CONSISTING OF AT LEAST THREE COMPONENTS, METHOD FOR PRODUCING SAID COATING SUBSTANCE AND USE THEREOF

(75) Inventors: Bernhard Lettmann, Drensteinfurt (DE); Egbert Nienhaus, Aschebert (DE)

(73) Assignee: BASF Coating AG, Munster (DE)

( * ) Notice: Subject to any disclaimer, the term of this patent is extended or adjusted under 35 U.S.C. 154(b) by 0 days.

(21) Appl. No.: 09/937,650

(22) PCT Filed: Mar. 27, 2000

(86) PCT No.: PCT/EP00/02672
§ 371 (c)(1),
(2), (4) Date: Nov. 8, 2001

(87) PCT Pub. No.: WO00/59977
PCT Pub. Date: Oct. 12, 2000

(30) Foreign Application Priority Data
Apr. 1, 1999  (DE) ......................................... 199 14 899

(51) Int. Cl.$^7$ ............................ C08L 75/04; C08L 67/02
(52) U.S. Cl. ....................... 524/591; 524/507; 524/539; 525/131; 525/440
(58) Field of Search .................................. 524/507, 539, 524/591; 525/131, 440

(56) References Cited

U.S. PATENT DOCUMENTS 5,753,756 A    5/1998  Aerts et al. ............... 525/111.5

FOREIGN PATENT DOCUMENTS

| DE | 42 23 183 C1 | 7/1993 | ........ C10M/135/26 |
| DE | 43 00 616 A1 | 7/1994 | ......... C09D/167/00 |
| DE | 44 21 823 A2 | 1/1996 | ......... C09D/175/04 |

*Primary Examiner*—Jeffrey B. Robertson

(57) ABSTRACT

A coating material consisting of at least three components, comprising a component (I) comprising at least one oligomeric or polymeric resin containing functional groups which react with isocyanate groups, as binder (A), a component (II) comprising at least one polyisocyanate as crosslinking agent (B), and a component (III) which comprises water, wherein component (I) and/or (III) comprise or comprises at least one low molecular weight and/or oligomeric, substantially unbranched, hydrophobic polyester (C) containing at least two hydroxyl groups in the molecule and having an OH number of from 56 to 500 mg KOH/g, an acid number <10 mg KOH/g and a number-average molecular weight Mn of from 450 to 2 000 daltons.

20 Claims, No Drawings

COATING SUBSTANCE CONSISTING OF AT LEAST THREE COMPONENTS, METHOD FOR PRODUCING SAID COATING SUBSTANCE AND USE THEREOF

The present invention relates to a coating material consisting of at least three components, comprising a component (I) comprising at least one oligomeric or polymeric resin containing functional groups which react with isocyanate groups, as binder (A), a component (II) comprising at least one polyisocyanate as crosslinking agent (B), and a component (III) which comprises water. The present invention additionally relates to a process for preparing this coating material and also to the use of the coating material in automotive OEM finishing and automotive refinish, in industrial coating, including coil coating and container coating, in the coating of plastics, and in furniture coating.

Coating materials of the abovementioned type are known from the German patents DE-A-195 42 626 or DE-A-44 21 823. These known coating materials already have comparatively few surface problems, such as popping marks or structuring, and as regards gloss, relaxation, spraying reliability, fullness, weathering stability, and other important technological properties they possess a good profile of properties. These known coating materials comprise hydrophilic polyesters.

The increasingly more stringent requirements of the market, however, are making it necessary to improve these known coating materials still further in terms of their homogeneity, stability, handling, and popping limits. Moreover, the solvent content is to be lowered further than has been possible to date. Furthermore, the resultant coatings should have an even higher gasoline resistance and an even lower gray haze.

The invention accordingly provides the novel coating material consisting of at least three components, comprising (I) a component comprising at least one oligomeric or polymeric resin containing functional groups which react with isocyanate groups, as binder (A), (II) a component comprising at least one polyisocyanate as crosslinking agent (B), and (III) a component which comprises water, characterized in that component (I) and/or (III) comprise or comprises at least one low molecular weight and/or oligomeric, substantially unbranched, hydrophobic polyester (C) containing at least two hydroxyl groups in the molecule and having an OH number of from 56 to 500 mg KOH/g, an acid number <10 mg KOH/g and a number-average molecular weight Mn of from 300 to 2 000 daltons.

In the text below the novel coating material consisting of at least three components is referred to for the sake of brevity as the "coating material of the invention".

The present invention further provides a process for preparing the coating material of the invention, and also provides for its use in automotive OEM finishing and automotive refinish, industrial coating, including coil coating and container coating, the coating of plastics, and furniture coating.

In the light of the prior art it was unforeseeable that the solution of the problem, with all of its advantages, could be achieved by means of the low molecular weight and/or oligomeric, substantially unbranched, hydrophobic polyesters (C) containing at least two hydroxyl groups in the molecule and having an OH number of from 56 to 500 mg KOH/g, an acid number <10 mg KOH/g and a number-average molecular weight Mn of from 300 to 2 000 daltons, for use in accordance with the invention.

In the text below, these low molecular weight and/or oligomeric, substantially unbranched, hydrophobic polyesters (C) of the stated specification, for use in accordance with the invention, are referred to as "hydrophobic polyesters (C)".

The coating material of the invention is notable, surprisingly, for a profile of properties which is improved over the prior art in relation in particular to the gloss, fullness, extremely low popping tendency, spraying reliability and leveling, and also in respect of the weathering stability.

It is surprising, furthermore, that the coating material of the invention comprising said at least three components—at least (I), (II) and (III), for example—may be prepared simply by mixing without the need for complicated mixing and/or dispersing apparatus as described, for example, in the German patent DE-A-195 10 651. The coating material of the invention is therefore suitable for the field in particular of automotive refinish, since it can be prepared by the painter by simple mixing of the components directly prior to its application and can be cured at low temperatures.

A further advantage is that the coating material of the invention has only a small fraction of volatile organic solvents, despite the fact that it is prepared using crosslinkers and binders dispersed and/or dissolved in organic media.

Moreover, the coating material of the invention ensures a high level of variability, since it is possible to use not only crosslinking agents, pigments and additives that are recommended for aqueous coating materials but also those used in conventional systems.

Finally, a feature of components (I), (II) and (III) of the coating material of the invention, which are for inventive use, is a very good storage stability, which corresponds to that of conventional coating materials.

The coating material of the invention is curable thermally and/or with actinic radiation.

In the context of the present invention, the term "thermal curing" means the heat-initiated curing of a film of a coating material, where normally a separate crosslinking agent is employed. This is customarily referred to by those in the art as external crosslinking.

In the context of the present invention, actinic radiation means electron beams or, preferably, UV radiation. Curing by UV radiation is customarily initiated by means of free-radical or cationic photoinitiators.

Where thermal curing and curing with actinic light are employed together for a coating material, the term "dual cure" is among those used.

The inventively essential constituent of the coating material of the invention are the hydrophobic polyesters (C).

In accordance with the invention, they are present in components (I) and/or (III) described in detail below. It is of advantage here if they are present therein in an amount such that in the finished coating material of the invention the resulting weight ratio of the binders (A), described in detail below, to hydrophobic polyesters (C) is up to 30:1, preferably up to 20:1, with particular preference up to 15:1, and in particular up to 10:1. In accordance with the invention it is of particular advantage if the hydrophobic polyesters (C) are present predominantly or only in component (I).

The hydrophobic polyesters (C) may be low molecular weight compounds, having a molecular weight, in particular from 300 to 700 daltons. In accordance with the invention, advantageous low molecular weight hydrophobic polyesters (C) are those which are nonvolatile under the conditions of the preparation and application of the coating material of the invention.
}

Alternatively, the hydrophobic polyesters (C) may be oligomeric compounds, having a number-average molecular weight Mn of from 400 to 2 000, preferably from 450 to 1 500, with particular preference from 600 to 1 200, and in particular from 650 to <1 000.

The low molecular weight and oligomeric hydrophobic polyesters (C) may be used individually or as a mixture.

The polyesters (C) are hydrophobic. In the context of the present invention the term "hydrophobic" refers in accordance with DIN EN ISO 862: 1995-10 to the constitutional property of a molecule to behave exophilically with respect to water, i.e., it displays the tendency not to penetrate into water, or to depart the aqueous phase.

The hydrophobic polyesters (C) are substantially unbranched, i.e., their molecules are substantially linear, in contrast to the dendrimers described below as reactive diluents.

The hydrophobic polyesters (C) contain at least 2, preferably 4, and in particular 3, hydroxyl groups in the molecule. The number of hydroxyl groups is advantageously chosen so as to give an OH number of from 56 to 500, preferably from 70 to 450, with particular preference from 80 to 350, and in particular from 100 to 300, mg KOH/g.

The hydrophobic polyesters (C) are substantially free of acid groups; in other words, they have an acid number <3 mg KOH/g.

Hydrophobic polyesters (C) used with preference in accordance with the invention have the general formula I

[R$^1$—CH(OH)—CH$_2$—OOC—]$_2$R  (1)

in which the variables have the following meaning:

R=substituted or unsubstituted divalent $C_1$ to $C_{20}$ alkanediyl, $C_2$ to $C_{20}$ alkenediyl, $C_4$ to $C_{20}$ cycloalkanediyl or cycloalkenediyl, $C_6$ to $C_{12}$ arylidene or divalent $C_6$ to $C_{20}$ arylalkyl, arylalkenyl, arylcycloalkyl or arylcycloalkenyl radical; or substituted or unsubstituted divalent aliphatic, cycloaliphatic, acyclic or cyclic olefinically unsaturated, aromatic, aliphatic-aromatic, cycloaliphatic-aromatic, acyclic unsaturated aromatic or cyclic unsaturated aromatic radical which contains at least one carboxylic ester group;

R$^1$=hydrogen atom or monovalent substituted or unsubstituted $C_1$ to $C_{20}$ alkyl, $C_2$ to $C_{20}$ alkenyl, $C_4$ to $C_{12}$ cycloalkyl or cycloalkenyl, $C_6$ to $C_{12}$ aryl or $C_6$ to $C_{20}$ arylalkyl, arylalkenyl, arylcycloalkyl, arylcycloalkenyl, alkylaryl, alkenylaryl, cycloalkylaryl, cycloalkenylaryl, alkylcycloalkyl, alkylcycloalkenyl, alkenylcycloalkyl, alkenylcycloalkenyl, cycloalkylalkyl, cycloalkenylalkyl, cycloalkylalkenyl or cycloalkenylalkenyl radical.

Examples of suitable $C_1$ to $C_{20}$ alkanediyl radicals R are methylene, ethylene, propane-1,3-diyl, tetramethylene, pentamethylene, hexamethylene, heptamethylene, dodecan-1,12-diyl or hexadecane-1,16-diyl.

Examples of suitable $C_2$ to $C_{20}$ alkenediyl radicals R are ethene-1,2-diyl, propene-1,3-diyl or decene-1,12-diyl.

Examples of suitable $C_4$ to $C_{20}$ cycloalkanediyl radicals R are cyclopentane-1,2- or 1,3-diyl or cyclohexan-1,2-, -1,3- or -1,4-diyl.

Examples of suitable $C_4$ to $C_{20}$ cycloalkenediyl radicals R are cyclopentene-1,2- or -1,3-diyl or cyclohexene-1,2-, -1,3- or 1,4-diyl, Examples of suitable $C_6$ to $C_{12}$ arylidene radicals R are 1,2-, 1,3- or 1,4-phenylene or 1,3-, 1,4- or 1,5-naphthylene or 1,4'-biphenylene.

Examples of suitable divalent $C_6$ to $C_{20}$ arylalkyl radicals R are

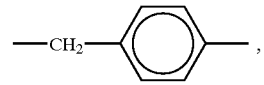

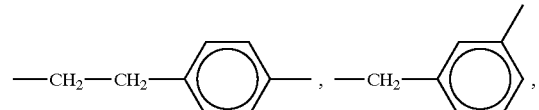

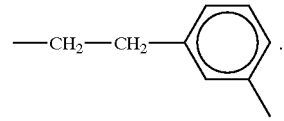

Examples of suitable divalent arylalkenyl radicals are

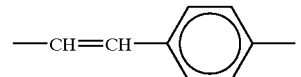

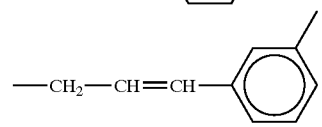

Examples of suitable divalent arylcycloalkyl radicals R are

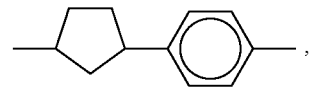

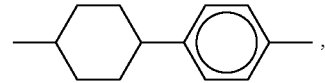

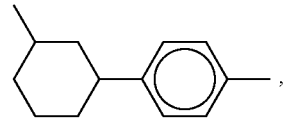

Examples of suitable divalent arylcycloalkenyl radicals R are

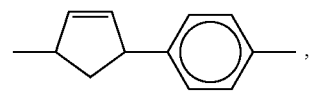

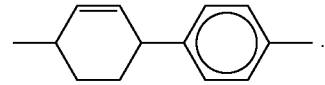

Examples of suitable divalent aliphatic, cycloaliphatic, aliphatic, acyclic or cyclic olefinically unsaturated, aromatic, aliphatic-aromatic, cycloaliphatic-aromatic, acyclic unsaturated aromatic or cyclic unsaturated aromatic radicals R containing at least one carboxylic ester group are

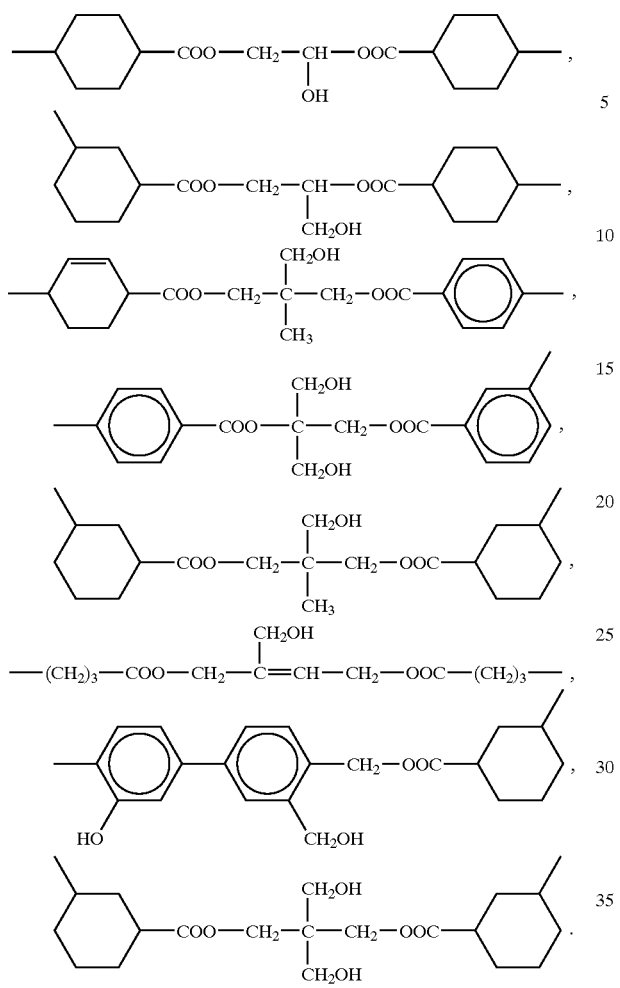

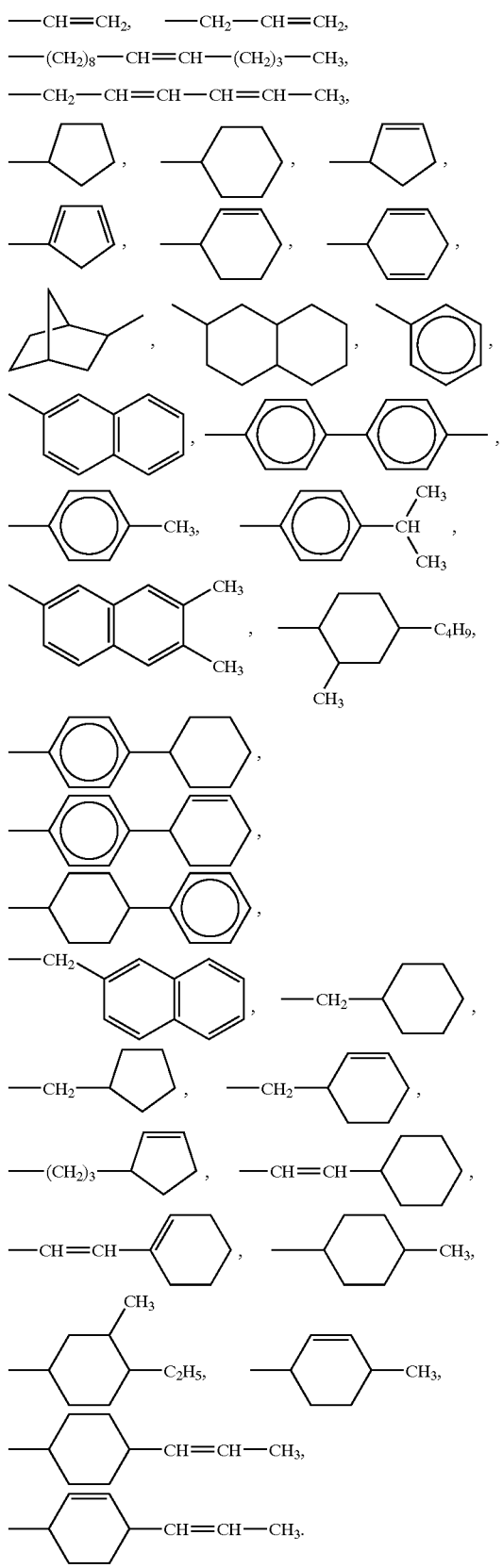

Suitable substituents for these radicals R include all organic functional groups which are substantially inert, i.e., which do not enter into any reactions with the crosslinking agents (B). Examples of suitable inert organic radicals are halogen atoms, nitro groups, nitrile groups or alkoxy groups. Further suitable substituents include functional groups which enter into crosslinking reactions with the crosslinking agents (B), such as amino, thiol or hydroxyl groups, of which the hydroxyl groups are particularly advantageous in accordance with the invention and are therefore used with particular preference.

In accordance with the invention it is of very particular advantage if the radical R contains at least one hydroxyl group as substituent.

Examples of suitable, unsubstituted or substituted $C_1$–$C_{10}$ alkyl radicals R1 for use in accordance with the invention are methyl, ethyl, propyl, butyl, pentyl, hexyl, heptyl, octyl, nonyl or decyl radicals.

Examples of suitable substituted or unsubstituted $C_2$ to $C_{20}$ alkenyl, $C_4$ to $C_{12}$ cycloalkyl or cycloalkenyl, $C_6$ to $C_{12}$ aryl or $C_6$ to $C_{20}$ arylalkyl, arylalkenyl, arylcycloalkyl, arylcycloalkenyl, alkylaryl, alkenylaryl, cycloalkylaryl, cycloalkenylaryl, alkylcycloalkyl, alkylcycloalkenyl, alkenylcycloalkyl, alkenylcycloalkenyl, cycloalkylalkyl, cycloalkenylalkyl, cycloalkylalkenyl or cycloalkenylalkenyl radicals $R^1$ are In accordance with the invention it is of advantage if the radical $R^1$ is substituted.

Examples of suitable substituents for the radical $R^1$ are —F, —Cl, —Br, —I, —CN, —NO2, —OH, —$OR^2$, —SH, —$SR^2$, —NH2, —$NHR^2$, —$N(NR^2)2$ and/or —OOC—$R^2$, in which the variable $R^2$ has the definition of $R^1$, with the exception of the hydrogen atom.

Examples of suitable radicals $R^2$ of this kind are those described above in connection with the radicals $R^1$.

Further examples of suitable radicals $R^2$ are branched $C_4$ to $C_{12}$ alkyl radicals, especially 1,1-dimethylethan-1-yl, -propan-1-yl, -butan-1-yl, -pentan-1-yl, -hexan-1-yl or -heptan-1-yl, which are of advantage in accordance with the invention and are therefore used with preference.

In accordance with the invention it is of particular advantage if the radical R1 is a monosubstituted methyl group.

Furthermore it is of particular advantage in accordance with the invention if the radical R1, particularly the methyl group, is substituted by —OOC—$R^2$.

The preparation of the hydrophobic polyester (C) has no special features in terms of its method but instead takes place with the aid of the customary and known methods of preparing low molecular weight and oligomeric polyesters. Examples of suitable methods are those described below in connection with the preparation of the binder (A2).

Low molecular weight hydrophobic polyesters (C) which are particularly advantageous in accordance with the invention may be prepared in particular by the reaction of hydroxydicarboxylic acids with epoxides.

name Cardura® E10, are especially advantageous and are therefore used with very particular preference.

One example of very particularly advantageous low molecular weight hydrophobic polyesters (C) is the reaction product malic acid with Cardura® E10.

Oligomeric hydrophobic polyesters (C) which are particularly advantageous in accordance with the invention may be prepared in particular by the reaction of the diols, triols or tetrols, described below in connection with the binders (A2), with the dicarboxylic acids, described below in connection with the binders (A2), and also the reaction of the resulting polyesters with the above-described epoxides. To prepare the polyesters, the polyols are reacted with one another in molar ratios such as to give linear structures. The skilled worker will therefore be able to determine the appropriate ratios on the basis of his or her experience or on the basis of simple preliminary tests.

In the case of the diols, the molar ratio of hydroxyl groups to carboxyl groups is advantageously 1.0, in the case of the triols it is advantageously 1.5, and in the case of the tetrols it is advantageously 2.0. The reaction may be conducted in stages or in a one-pot process.

In accordance with the invention, triols are particularly advantageous and are therefore used with particularly preference. One example of the particularly advantageous triols is trimethylolpropane, which is used with very particular preference.

In accordance with the invention, the aliphatic and cycloaliphatic dicarboxylic acids are particularly advantageous and are therefore used with particular preference. One example of the particularly advantageous aliphatic dicarboxylic acids is adipic acid; one example of the particularly advantageous cycloaliphatic dicarboxylic acids is hexahydrophthalic acid.

Instead of the dicarboxylic acids it is also possible, where they exist, to use their anhydrides or their derivatives capable of transesterification, such as the alkyl esters.

The further essential constituent of component (I) of the coating material of the invention is at least one oligomeric or polymeric resin which is in dispersion or solution in one or more organic, optionally water-dilutable solvents and which contains functional groups which react with isocyanate groups, as binder (A).

Examples of suitable functional groups that react with isocyanate groups, for use in accordance with the invention, are amino, thio and/or hydroxyl groups, of which the hydroxyl groups are particularly advantageous and are therefore particularly preferred in accordance with the invention.

Accordingly, the binders (A) preferred in accordance with the invention are hydroxyl-containing oligomeric or polymeric resins.

Examples of suitable binders (A) preferred in accordance with the invention are hydroxyl-containing linear and/or branched and/or block, comb and/or random poly(meth) acrylates, polyesters, alkyds, polyurethanes, acrylated polyurethanes, acrylated polyesters, polylactones, polycarbonates, polyethers, epoxy resinamine adducts, (meth)acrylate diols, partially saponified polyvinyl esters or polyureas, of which the poly(meth)acrylates, the polyesters, the polyurethanes, the polyethers and the epoxy resin-amine adducts are particularly advantageous and are therefore used with particular preference.

Regarding the preparability, handling and particularly advantageous properties of the coating material of the invention that is prepared therewith, the poly-(meth)acrylates, the polyesters and/or the polyurethanes (A) afford very particular advantages, and so are used with very particular preference in accordance with the invention.

Besides the hydroxyl groups, these binders (A) may also contain other functional groups such as acryloyl, amide, imide, carbonate or epoxide groups.

In accordance with the invention it is further of advantage if at least one of the binders (A) employed in each case in component (I), or all of the binders (A) employed in each case in component (I), is or are, viewed per se, dispersible or soluble in water.

Examples of suitable water-soluble or -dispersible binders (A) contain either (i) functional groups which may be converted into cations by neutralizing agents and/or quarternizing agents, and/or cationic groups or (ii) functional groups which may be converted into anions by neutralizing agents, and/or anionic groups and/or (iii) nonionic hydrophilic groups.

Examples of suitable functional groups for use in accordance with the invention that may be converted into cations by neutralizing agents and/or quaternizing agents are primary, secondary or tertiary amino groups, secondary sulfide groups or tertiary phoshine groups, especially tertiary amino groups or secondary sulfide groups.

Examples of suitable cationic groups for use in accordance with the invention are primary, secondary, tertiary or quaternary ammonium groups, tertiary sulfonium groups or quaternary phosphonium groups, preferably quaternary ammonium groups or quaternary ammonium groups, tertiary sulfonium groups, but especially tertiary sulfonium groups.

Examples of suitable functional groups to be used in accordance with the invention that may be converted into anions by neutralizing agents are carboxylic acid, sulfonic acid or phosphonic acid groups, especially carboxylic acid groups.

Examples of suitable anionic groups for use in accordance with the invention are carboxylate, sulfonate or phosphonate groups, especially carboxylate groups.

Examples of suitable nonionic hydrophilic groups for use in accordance with the invention are polyether groups, especially poly(alkylene ether) groups.

Regarding the preparability, handling and particularly advantageous properties of the coating materials of the invention that are produced with them, the binders (A) which contain the anion-forming groups and/or anions (ii), especially the carboxylic acid groups and/or the carboxylate groups, afford very particular advantages and so are used with very particular preference in accordance with the invention.

Examples of very particularly preferred binders (A) of the last-mentioned kind, for use in accordance with the invention, are

- (A1) acrylate copolymers (A1) which are dispersible or soluble in one or more organic, optionally water-dilutable solvents, contain hydroxyl groups and carboxylic acid groups and/or carboxylate groups, and have a number-average molecular weight Mn of between 1 000 and 30 000 daltons, an OH number of from 40 to 200 mg KOH/g and an acid number of from 5 to 150 mg KOH/g,
- (A2) hydrophilic water-dispersible polyester resins (A2) which are dispersible or soluble in one or more organic, optionally water-dilutable solvents, contain hydroxyl groups and carboxylic acid groups and/or carboxylate groups, and have a number-average molecular weight Mn of between 1 000 and 30 000 daltons, an OH number of from 30 to 250 mg KOH/g and an acid number of from 15 to 150 mg KOH/g and/or
- (A3) polyurethane resins (A3) which are dispersible or soluble in one or more organic, optionally water-dilutable solvents, contain hydroxyl groups and carboxylic acid groups and/or carboxylate groups, and have a number-average molecular weight Mn of between 1 000 and 30 000 daltons, an OH number of from 20 to 200 mg KOH/g and an acid number of from 5 to 150 mg KOH/g.

The binders (A1), (A2) and (A3) are present individually or as a mixture in component (I), which where appropriate also contain at least one of the above-described binders (A), with the exception of those binders (A) which contain functional groups (i) which may be converted into cations by neutralizing agents and/or quaternizing agents, and/or cationic groups (i). In the text below, these binders (A) which may be used where appropriate with the binders (A1), (A2) and/or (A3) are referred to as binders (A4).

In accordance with the invention, components (I) which comprise the binders (A1), (A2) and/or (A3) and also, where appropriate, (A4) afford very particular advantages and are therefore used with very particular preference.

Similarly, the coating materials of the invention which comprise this very particularly preferred component (I) have very particular advantages and are therefore used with very particular preference.

If the mixing of components (I), (II) and (III) is to take place by manual stirring, it is of advantage for the coating material of the invention if the binders (A), especially the binders (A1), (A2) and/or (A3) and (A4), are selected such that the 50% strength solution of the binders (A) in ethoxyethyl propionate at 23° C. has a viscosity of $\leq 10$ dpas. Where mechanical mixing is to take place, it is possible to use binders (A) of higher viscosity, whose 50% strength solution in ethoxyethyl propionate at 23° C. has a viscosity of $\leq 100$ dPas. The viscosity is limited at the top end only by the performance capacity of the mixing units.

Suitable acrylate copolymers (A1) are all acrylate copolymers having the stated OH numbers, acid numbers, molecular weights, and viscosities.

In particular, use is made of acrylate copolymers (A1) obtainable by polymerizing

- a1) a (meth)acrylic ester which is substantially free from acid groups and is different from but copolymerizable with (a2), (a3), (a4), (a5), and (a6); or a mixture of such monomers,
- a2) an ethylenically unsaturated monomer which carries at least one hydroxyl group per molecule and is substantially free from acid groups, and which is copolymerizable with (a1), (a3), (a4), (a5), and (a6) but different from (a5); or a mixture of such monomers,
- a3) an ethylenically unsaturated monomer which carries per molecule at least one acid group which can be converted into the corresponding acid anion group, and which is copolymerizable with (a1), (a2), (a4), (a5), and (a6); or a mixture of such monomers, and
- a4) if desired, one or more vinyl esters of alpha-branched monocarboxylic acids having from 5 to 18 carbon atoms per molecule, and/or
- a5) if desired, at least one reaction product of acrylic acid and/or methacrylic acid with the glycidyl ester of an alpha-branched monocarboxylic acid having from 5 to 18 carbon atoms per molecule, or instead of the reaction product an equivalent amount of acrylic and/or methacrylic acid which is then reacted during or after the polymerization reaction with the glycidyl ester of an alpha-branched monocarboxylic acid having from 5 to 18 carbon atoms per molecule,
- a6) if desired, an ethylenically unsaturated monomer which is substantially free from acid groups, is copolymerizable with (a1), (a2), (a3), (a4), and (a5) but different from (a1), (a2), (a4), and (a5); or a mixture of such monomers, in an organic solvent or a solvent mixture and in the presence of at least one polymerization initiator, the nature and amount of (a1), (a2), (a3), (a4), (a5), and (a6) being selected so that the polyacrylate resin (A1) has the desired OH number, acid number, and molecular weight.

To prepare the polyacrylate resins used inventively it is possible as monomer (a1) to use any (meth)acrylic alkyl or cycloalkyl ester which is copolymerizable with (a2), (a3), (a4), (a5), and (a6) and which has up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyl triglycol (meth)acrylate and methoxyoligoglycol (meth) acrylate having a molecular weight Mn of preferably 550; or other ethoxylated and/or propoxylated, hydroxyl-free (meth)acrylic acid derivatives. These may contain minor amounts of (meth) acrylic alkyl or cycloalkyl esters of higher functionality, such as ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol di(meth)acrylate; trimethylolpropane di- or tri(meth)acrylate; or pentaerythritol di(meth)acrylate, tri(meth)acrylate or tetra(meth)acrylate. In the context of the present invention, minor amounts of monomers of higher functionality are understood as being amounts which do not lead to crosslinking or gelling of the polyacrylate resins.

As monomers (a2) it is possible to use ethylenically unsaturated monomers which carry at least one hydroxyl group per molecule and are substantially free from acid groups, and are copolymerizable with (a1), (a2), (a3), (a4), (a5), and (a6) but different from (a5), such as hydroxyalkyl esters of acrylic acid, methacrylic acid or another alpha, beta-ethylenically unsaturated carboxylic acid which are derived from an alkylene glycol which is esterified with the acid or are obtainable by reacting the acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsiloncaprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. Regarding these monomers (a2) of higher functionality, the comments made regarding the higher-functional monomers (a1) apply analogously. The fraction of trimethylolpropane monoallyl ether is usually from 2 to 10% by weight, based on the overall weight of the monomers (a1) to (a6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers, but in particular may also be used proportionally in combination with other of the hydroxyl-containing monomers mentioned.

As monomer (a3), it is possible to use any ethylenically unsaturated monomer which carries at least one acid group, preferably a carboxyl group, per molecule and is copolymerizable with (a1), (a2), (a4), (a5), and (a6); or a mixture of such monomers. Acrylic acid and/or methacrylic acid are used with particular preference as component (a3). It is, however, also possible to use other ethylenically unsaturated carboxylic acids having up to 6 carbon atoms in the molecule. Examples of such acids are ethacrylic acid, crotonic acid, maleic acid, fumaric acid, and itaconic acid. A further possibility is to use ethylenically unsaturated sulfonic or phosphonic acids, and/or their partial esters, as component (a3). Further suitable components (a3) include mono(meth)acryloyloxyethyl maleate, succinate, and phthalate.

As monomers (a4), use is made of one or more vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be prepared conventionally from the acids, by reacting the acid with acetylene, for example. Particular preference is given—owing to their ready availability—to using vinyl esters of saturated aliphatic monocarboxylic acids having 9 to 11 carbon atoms that are branched on the alpha carbon atom.

As monomers (a5), the reaction product of acrylic acid and/or methacrylic acid with the glycidyl ester of an alpha-branched monocarboxylic acid having from 5 to 18 carbon atoms per molecule is used. Glycidyl esters of highly branched monocarboxylic acids are available under the trade name "Cardura". The reaction of acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic acid. This glycidyl ester is available commercially under the name "Cardura E10".

As monomers (a6) it is possible to use all ethylenically unsaturated monomers that are substantially free from acid groups and are copolymerizable with (a1), (a2), (a3), (a4), and (a5) but different from (a1), (a2), (a3), and (a4); or mixtures of such monomers. Suitable components (a6) include olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers which have a number-average molecular weight Mn of from 1 000 to 40 000, preferably from 2 000 to 20 000, with particular preference from 2 500 to 10 000, and in particular from 3 000 to 7 000, and contain on average from 0.5 to 2.5, preferably from 0.5 to 1.5, ethylenically unsaturated double bonds per molecule, as described in DE-A 38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823, or in the the international patent application WO 92/22615 on page 12, line 18 to page 18, line 10, or acryloxysilane-containing vinyl monomers, preparable by reacting hydroxy-functional silanes with epichlorohydrin and then reacting that reaction product with methacrylic acid and/or hydroxyalkyl esters of (meth) acrylic acid.

It is preferred to use vinylaromatic hydrocarbons.

It is of advantage to use the polysiloxane macromonomers (a6) together with other monomers (a6). In this case the amount of the polysiloxane macromonomer or macromonomers (a6) for modifying the acrylate copolymers (A1) should be less than 5% by weight, preferably from 0.05 to 2.5% by weight, with particular preference from 0.05 to 0.8% by weight, based in each case on the overall weight of the monomers used to prepare the copolymer (A1). The use of such polysiloxane macromonomers leads to an improvement in the slip and leveling of the coatings of the invention.

The nature and amount of components (a1) to (a6) is selected such that the polyacrylate resin (A1) has the desired OH number, acid number, and glass transition temperature. Acrylate resins used with particular preference are obtained by polymerizing

- (a1) from 20 to 60% by weight, preferably from 30 to 50% by weight, of component (a1),
- (a2) from 10 to 50% by weight, preferably from 15 to 40% by weight, of component (a2),
- (a3) from 1 to 15% by weight, preferably from 1 to 8% by weight, of component (a3),
- (a4) from 0 to 25% by weight, preferably from 5 to 15% by weight, of component (a4),
- (a5) from 0 to 25% by weight, preferably from 5 to 15% by weight, of component (a5), and
- (a6) from 5 to 30% by weight, preferably from 10 to 20% by weight, of component (a6), the sum of the weight fractions of components (a1) to (a6) being in each case 100% by weight.

The polyacrylate resins (A1) used inventively are prepared in an organic solvent or solvent mixture and in the presence of at least one polymerization initiator. Organic solvents and polymerization initiators used are the solvents and polymerization initiators which are customary for the preparation of polyacrylate resins and suitable for the preparation of aqueous dispersions. The solvents may participate in the reaction with the crosslinking component (II) and may therefore act as reactive diluents (E).

Examples of suitable reactive diluents (E) for thermal curing are oligomeric polyols obtainable by hydroformylation and subsequent hydrogenation of oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene, and 7-oxanorbornene; examples of suitable acyclic monoolefins are contained in hydrocarbon mixtures obtained in petroleum processing by cracking ($C_5$ cut); examples of suitable oligomeric polyols for use in accordance with the invention have a hydroxyl number of from 200 to 450, a number-average molecular weight Mn of from 400 to 1 000, and a mass-average molecular weight Mw of from 600 to 1 100;

Further examples of suitable reactive diluents (E) are branched, cyclic and/or acyclic $C_9$–$C_{16}$ alkanes functionalized with at least two hydroxyl groups, especially diethyloctanediols.

Further examples of suitable reactive diluents (E) are hyperbranched compounds having a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxymethyl-1,4-butanediol (homopentaerythritol). These reactive diluents may be prepared by the customary and known methods of preparing hyperbranched and dendrimer compounds. Suitable synthesis methods are described, for example, in the patents WO 93/17060 and WO 96/12754 or in the book by G. R. Newkome, C. N. Moorefield and F. Vögtle, "Dendritic Molecules, Concepts, Syntheses, Perspectives", VCH, Weinheim, New York, 1996.

Further examples of suitable reactive diluents (E) are polycarbonatediols, polyesterpolyols, poly(meth)acrylatediols or hydroxyl-containing polyaddition products.

Examples of suitable isocyanate-reactive solvents that may be regarded as monofunctional reactive diluents (E) are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, trimethylolpropane, ethyl 2-hydroxypropionate or 3-methyl-3-methoxybutanol and also derivatives based on propylene glycol, e.g., isopropoxypropanol.

Said reactive diluents and/or the isocyanate-reactive solvents (E) may also be present in component (III).

It is also possible in this context first to prepare the polyacrylate resins (A1) in a solvent which is not water-dilutable and following the polymerization to replace some or all of this solvent by water-dilutable solvent.

Examples of suitable polymerization initiators are initiators which form free radicals, such as tert-butyl peroxyethylhexanoate, benzoyl peroxide, di-tert-amyl peroxide, azobisisobutyronitrile, and tert-butyl perbenzoate, for example. The initiators are used preferably in an amount from 1 to 25% by weight, with particular preference from 2 to 10% by weight, based on the overall weight of the monomers.

The polymerization is appropriately conducted at a temperature from 80 to 200° C., preferably from 110 to 180° C.

The polyacrylate resin (A1) is preferably prepared by a two-stage process, since in that way the resultant coating materials of the invention possess better processing properties. It is therefore preferred to use polyacrylate resins which are obtainable by 1. polymerizing a mixture of (a1), (a2), (a4), (a5), and (a6), or a mixture of portions of components (a1), (a2), (a4), (a5), and (a6), in an organic solvent and/or in one of the abovementioned reactive diluents,
2. after at least 60% by weight of the mixture consisting of (a1), (a2), (a4), (a5), and, where used, (a6) have been added, adding (a3) and any remainder of components (a1), (a2), (a4), (a5), and (a6), and continuing polymerization, and
3. after the end of the polymerization, subjecting the resulting polyacrylate resin if desired to at least partial neutralization, i.e., converting the acid groups into the corresponding acid anion groups.

In addition, however, it is also possible to include components (a4) and/or (a5) in the initial charge together with at least part of the solvent, and to meter in the remaining components. Moreover, it is also possible for components (a4) and/or (a5) to be included only in part in the initial charge, together with at least part of the solvent, and for the remainder of these components to be added as described above. Preferably, for example, at least 20% by weight of the solvent and about 10% by weight of component (a4) and (a5), and also, if desired, portions of components (a1) and (a6), are included in the initial charge.

Preference is also given to preparing the polyacrylate resins (A1) for inventive use by means of a two-stage process in which, the first stage lasts from 1 to 8 hours, preferably from 1.5 to 4 hours, and the mixture of (a3) and any remainder of components (a1), (a2), (a4), (a5), and (a6) is added over the course of from 20 to 120 minutes, preferably over the course of from 30 to 90 minutes.

Following the end of the addition of the mixture consisting of (a3) and any remainder of components (a1), (a2), (a4), (a5), and (a6), polymerization is continued until all of the monomers used have undergone substantially complete reaction. The second stage here may immediately follow the first. However, the second stage may only be begun after a certain time; for example, after from 10 minutes to 10 hours.

The amount and rate of addition of the initiator is preferably chosen so as to give a polyacrylate resin (A1) having a number-average molecular weight Mn of from 1 000 to 30 000 daltons. It is preferred to commence the initiator feed a certain time, generally about 15 minutes, before the feeding of the monomers. Preference is given, further, to a process in which the addition of initiator is commenced at the same point in time as the addition of the monomers and is ended about half an hour after the addition of the monomers has ended. The initiator is preferably added in a constant amount per unit time. Following the end of the addition of initiator, the reaction mixture is held at polymerization temperature until (generally 1.5 hours) all of the monomers used have undergone substantially complete reaction. "Substantially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

Preferably, the monomers for preparing the polyacrylate resins (A1) are polymerized at a polymerization solids which is not too high, preferably at a polymerization solids of from 80 to 50% by weight, based on the comonomers, and then the solvents are removed in part by distillation, so that the resulting polyacrylate resin solutions (A1) have a solids content of preferably from 100 to 60% by weight.

The preparation of the polyacrylate resins (A1) for inventive use has no special features in terms of its method but instead takes place by means of the methods of continuous or batchwise copolymerization that are known and customary in the polymers field, under atmospheric pressure or superatmospheric pressure, in stirred tanks, autoclaves, tube reactors or Taylor reactors.

Examples of suitable (co)polymerization processes are described in the patents DE-A-197 09 465, DE-C-197 09 476, DE-A-28 48 906, DE-A-195 24 182, EP-A-0 554 783, WO 95/27742 or WO 82/02387.

Taylor reactors, which serve to convert substances under the conditions of Taylor flow, are known. They consist substantially of two coaxial concentric cylinders of which the outer is fixed and the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. In addition to the angular velocity of the stirrer, the Taylor number is also dependent on the kinematic viscosity $v$ of the fluid in the gap and on the geometric parameters, the external radius of the inner cylinder $r_i$, the internal radius of the outer cylinder $r_o$, and the gap width d, the difference between the two radii, in accordance with the following formula:

$$Ta = \omega_i r_i d \, v^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. Any increase in the rotary speed is accompanied by an increase in the centrifugal force as well. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Accordingly, the flow system behaves as an ideal flow tube in that the vortex pairs pass through the gap with constant residence time, like ideal stirred tanks.

Of advantage in accordance with the invention here are Taylor reactors having an external reactor wall located within which there is a concentrically or eccentrically disposed rotor, a reactor floor, and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow traversal.

Suitable polyesters (A2) are all polyesters having the stated OH numbers, acid numbers, molecular weights, and viscosities.

In particular, use is made of polyesters (A2) obtainable by reacting p1) optionally sulfonated polycarboxylic acids or their esterifiable derivatives, together if desired with monocarboxylic acids, p2) polyols, together if desired with monools, p3) if desired, further modifying components, and p4) if desired, a component which is reactive with the reaction product of (p1), (p2) and, where used, (p3).

Examples that may be given of polycarboxylic acids that may be used as component (p1) are aromatic, aliphatic, and cycloaliphatic polycarboxylic acids. As component (p1) it is preferred to use aromatic and/or aliphatic polycarboxylic acids.

Examples of suitable polycarboxylic acids are phthalic acid, isophthalic acid, terephthalic acid, phthalic, isophthalic or terephthalic monosulfonate, halophthalic acids, such as tetrachlorophthalic or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, or cyclobutanetetracarboxylic acid. The cycloaliphatic polycarboxylic acids may be used either in their cis or in their trans form or as a mixture of both forms. Also suitable are the esterifiable derivatives of the aforementioned polycarboxylic acids, such as their monoesters or polyesters with aliphatic alcohols having from 1 to 4 carbon atoms or hydroxy alcohols having from 1 to 4 carbon atoms, for example. It is also possible to use the anhydrides of the abovementioned acids, where they exist.

If desired, together with the polycarboxylic acids it is also possible to use monocarboxylic acids, such as benzoic acid, tert-butylbenzoic acid, lauric acid, isononanoic acid, and fatty acids of naturally occurring oils, for example. Isononanoic acid is a preferred monocarboxylic acid used.

Suitable alcohol components (p2) for preparing the polyester (A2) are polyhydric alcohols, such as ethylene glycol, propanediols, butanediols, hexanediols, neopentyl hydroxypivalate, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, homopentaerythritol, dipentaerythritol, trishydroxyethyl isocyanate, polyethylene glycol, polypropylene glycol, alone or together with monohydric alcohols, such as butanol, octanol, lauryl alcohol, cyclohexanol, tert-butylcyclohexanol, ethoxylated and/or propoxylated phenols. Also suitable, described below in connection with the binders (A3), are the diols (u1) of the general formula 2 and the diols (u2) of the general formula 3.

Compounds suitable as component (p3) for preparing the polyesters (A2) include in particular those having a group which is reactive toward the Functional groups of the polyester, with the exception of the compounds specified as component (p4). As modifying component (p3) it is preferred to use polyisocyanates and/or diepoxide compounds, and also, if desired, monoisocyanates and/or monoepoxide compounds. Suitable components (p3) are described, for example, in DE-A-40 24 204 on page 4, lines 4 to 9.

Compounds suitable as component (p4) for preparing the polyesters (A2) are those compounds which in addition to a group that is reactive toward the functional groups of the polyester (A2) also contain a tertiary amino group, examples including monoisocyanates containing at least one tertiary amino group, or mercapto compounds containing at least one tertiary amino group. For details, refer to DE-A-40 24 204, page 4, lines 10 to 49.

The polyesters (A2) are prepared in accordance with the known methods of esterification, as is described, for example, in DE-A-40 24 204, page 4, lines 50 to 65. This reaction takes place usually at temperatures between 180 and 280° C., in the absence or presence of an appropriate esterification catalyst, such as lithium octoate, dibutyltin oxide, dibutyltin dilaurate or para-toluenesulfonic acid, for example.

The polyesters (A2) are normally prepared in the presence of small amounts of an appropriate solvent as entrainer. Examples of entrainers used include aromatic hydrocarbons, such as xylene in particular, and (cyclo)aliphatic hydrocarbons, e.g., cyclohexane or methylcyclohexane.

As component (A2) it is particularly preferred to use polyesters which have been prepared by a two-stage process, by first preparing a hydroxyl-containing polyester having an OH number of from 100 to 300 mg KOH/g, an acid number of less than 10 mg KOH/g, and a number-average molecular weight Mn of from 500 to 2 000 daltons, which is then reacted in a second stage with carboxylic anhydrides to give the desired polyester (A2). The amount of carboxylic anhydrides in this case is chosen so that the resulting polyester has the desired acid number. Acid anhydrides suitable for this reaction are all those commonly used, such as hexahydrophthalic anhydride, trimellitic anhydride, pyromellitic anhydride, phthalic anhydride, camphoric anhydride, tetrahydrophthalic anhydride, succinic anhydride, and mixtures of these and/or other anhydrides, and especially anhydrides of aromatic polycarboxylic acids, such as trimellitic anhydride, for example.

It is possible if desired for the polyacrylate resin (A1) to have been prepared at least in part in the presence of the polyester (A2). In this case, advantageously at least 20% by weight and with particular advantage from 40 to 80% by weight of the component (A1) are prepared in the presence of the component (A2).

Any remainder of the component (A1) is added subsequently to the binder solution. In this case it is possible for this already polymerized resin to have the same monomer composition as the polyacrylate resin synthesized in the presence of the polyester. Alternatively, a hydroxyl-containing polyacrylate resin having a different monomer composition may be added. Also possible is the addition of a mixture of different polyacrylate resins and/or polyesters, with possibly one resin having the same monomer composition as the polyacrylate resin synthesized in the presence of the polyester.

As the polyurethane resin (A3) containing hydroxyl and acid groups for use inventively, suitable resins include all polyurethane resins having the OH numbers, acid numbers, molecular weights, and viscosities indicated.

Suitable polyurethane resins are described, for example, in the following documents: EP-A-355 433, DE-A-35 45 618, DE-A-38 13 866, DE-A-32 10 051, DE-A-26 24 442, DE-A-37 39 332, U.S. Pat. No. 4,719,132, EP-A-89 497, U.S. Pat. No. 4,558,090, U.S. Pat. No. 4,489,135, DE-A-36 28 124, EP-A-158 099, DE-A-29 26 584, EP-A-195 931, DE-A-33 21 180, and DE-A-40 05 961.

In component (I) it is preferred to use polyurethane resins (A3) which are preparable by reacting isocyanato-containing prepolymers with compounds that are reactive toward isocyanate groups.

The preparation of isocyanato-containing prepolymers may take place by reacting polyols having a hydroxyl number of from 10 to 1 800, preferably from 50 to 1 200 mg KOH/g with excess polyisocyanates at temperatures of up to 150° C., preferably from 50 to 130° C., in organic solvents which are unable to react with isocyanates. The equivalents ratio of NCO groups to OH groups is situated between 2.0:1.0 and >1.0:1.0, preferably between 1.4:1 and 1.1:1.

The polyols used to prepare the prepolymer may be of low molecular weight and/or high molecular weight and may contain groups that are slow to react and are anionic or capable of forming anions. It is also possible to use low molecular weight polyols having a molecular weight of from 60 up to 400 daltons to prepare the isocyanato-containing prepolymers. In this case amounts of up to 30% by weight of the overall polyol constituents are used, preferably from about 2 to 20% by weight.

In order to obtain an NCO prepolymer of high flexibility, a high fraction of a predominantly linear polyol having a preferred OH number of from 30 to 150 mg KOH/g should be added. Up to 97% by weight of the overall polyol may consist of saturated and unsaturated polyesters and/or polyethers having a number-average molecular weight Mn of from 400 to 5 000 daltons. The selected polyetherdiols should not introduce excessive amounts of ether groups, since otherwise the polymers formed start to swell in water.

Polyesterdiols are prepared by esterifying organic dicarboxylic acids or their anhydrides with organic diols, or derive from a hydroxycarboxylic acid or from a lactone. In order to prepare branched polyester polyols, it is possible to employ a minor proportion of polyols or polycarboxylic acids having a higher functionality.

The alcohol component used to prepare the polyurethane resins preferably consists at least to a certain extent of $u_1$) at least one diol of the formula 2

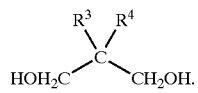
(2)

in which $R^3$ and $R^4$ are each an identical or different radical and are an alkyl radical having from 1 to 18 carbon atoms, an aryl radical or a cycloaliphatic radical, with the proviso that $R^3$ and/or $R^4$ must not be methyl, and/or $U_2$) at least one diol of the formula 3

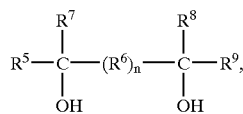
(3)

in which $R^5$, $R^7$, $R^8$ and $R^9$ are each identical or different radicals and are an alkyl radical having from 1 to 6 carbon atoms, a cycloalkyl radical or an aryl radical and $R^6$ is an alkyl radical having from 1 to 6 carbon atoms, an aryl radical or an unsaturated alkyl radical having from 1 to 6 carbon atoms, and n is either 0 or 1.

Suitable diols ($u_1$) are all propanediols of the formula 2 in which either $R^3$ or $R^4$ or $R^3$ and $R^4$ is or are other than methyl, such as 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.]heptane, 2,2-diethyl-1,3-propanediol, 2,2-dipropyl-1,3-propanediol, 2-cyclohexyl-2-methyl-1,3-propanediol, et cetera.

Examples of diols ($u_2$) (formula 2) that may be used include 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene, and 1,3-(2'-hydroxypropyl)benzene.

As diols ($u_1$) it is preferred to use 2-propyl-2-ethyl-1,3-propanediol, 2,2-diethyl-1,3-propanediol, 2-butyl-2-ethyl-1,3-propanediol, and 2-phenyl-2-ethyl-1,3-propanediol, and as component ($u_2$) it is preferred to use 2,3-dimethyl-2,3-butanediol and also 2,5-di-methyl-2,5-hexanediol. Particular preference is given to using 2-butyl-2-ethyl-1,3-propanediol and also 2-phenyl-2-ethyl-1,3-propanediol as component ($a_1$) and 2,5-dimethyl-2,5-hexanediol as component ($u_2$).

The diols ($u_1$) and/or ($u_2$) are commonly used in an amount of from 0.5 to 15% by weight, preferably from 1 to 7% by weight, based in each case on the overall weight of the synthesis components used to prepare the polyurethane resins (A3).

Typical multifunctional isocyanates used to prepare the polyurethane resins are aliphatic, cycloaliphatic and/or aromatic polyisocyanates containing at least two isocyanate groups per molecule. Preference is given to the isomers or isomer mixtures of organic diisocyanates. Owing to their good stability to ultraviolet light, (cyclo)aliphatic diisocyanates give rise to products having only a low tendency to yellow. The polyisocyanate component used to form the prepolymer may also contain a fraction of polyisocyanates of higher functionality, provided that no gelling is caused as a result. Products which have become established as triisocyanates are those formed by trimerization or oligomerization of diisocyanates or by reaction of diisocyanates with polyfunctional compounds containing OH or NH groups. The average functionality may be lowered if desired by adding monoisocyanates.

Examples of polyisocyanates that may be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

To prepare high-solids polyurethane resin solutions, use is made in particular of diisocyanates of the general formula 3

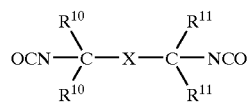
(3)

where X is a divalent aromatic hydrocarbon radical, preferably an unsubstituted or halogen-, methyl- or methoxy-substituted naphthylene, diphenylene or 1,2-, 1,3- or 1,4-phenylene radical, with particular preference a 1,3-phenylene radical, and $R^{10}$ and $R^{11}$ are an alkyl radical having 1–4 carbon atoms, preferably a methyl radical. Diisocyanates of the formula 3 are known (their preparation is described, for example, in EP-A-101 832, U.S. Pat. No. 3,290,350, U.S. Pat. No. 4,130,577, and U.S. Pat. No. 4,439,616) and some are available commercially (1,3-bis(2-isocyanatoprop-2-yl)benzene, for example, is sold by the American Cynamid Company under the trade name TMXDI (META)®).

Further preferred as polyisocyanate components are diisocyanates of the formula 4:

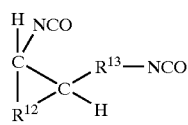
(4)

where: $R^{12}$ is a divalent alkyl or aralkyl radical having from 3 to 20 carbon atoms and $R^{13}$ is a divalent alkyl or aralkyl radical having from 1 to 20 carbon atoms;

In particular 1-isocyanato-2-(3-isocyanatoprop-1-yl)-cyclohexane.

Polyurethanes are generally incompatible with water unless specific constituents are incorporated and/or special preparation steps are taken in the course of their synthesis. To prepare the polyurethane resins it is thus possible to use compounds which contain two H-active groups that are reactive with isocyanate groups, and at least one group which ensures dispersibility in water. Suitable groups of this kind are nonionic groups (e.g., polyethers), anionic groups, mixtures of these two groups, or cationic groups.

Accordingly it is possible to build into the polyurethane resin an acid number which is sufficiently high that the neutralized product can be dispersed stably in water. For this purpose use is made of compounds containing at least one isocyanate-reactive group and at least one group capable of forming anions. Suitable isocyanate-reactive groups are, in particular, hydroxyl groups and also primary and/or secondary amino groups. Groups capable of forming anions are carboxyl, sulfonic acid and/or phosphonic acid groups. It is preferred to use alkanoic acids having two substituents on the alpha carbon atom. The substituent may be a hydroxyl group, an alkyl group or an alkylol group. These polyols have at least one, generally from 1 to 3, carboxyl groups in the molecule. They have from 2 to about 25, preferably from 3 to 10, carbon atoms. The carboxyl-containing polyol may account for from 3 to 100% by weight, preferably from 5 to 50% by weight, of the overall polyol constituent in the NCO prepolymer.

The amount of ionizable carboxyl groups that is available by virtue of the carboxyl group neutralization in salt form is generally at least 0.4% by weight, preferably at least 0.7% by weight, based on the solids. The upper limit is approximately 12% by weight. The amount of dihydroxyalkanoic acids in the unneutralized prepolymer gives an acid number of at least 5 mg KOH/g, preferably at least 10 mg KOH/g. With very low acid numbers, it is generally necessary to take further measures to achieve dispersibility in water. The upper limit on the acid number is 150 mg KOH/g, preferably 40 mg KOH/g, based on the solids. The acid number is preferably situated within the range from 20 to 40 mg KOH/g.

The isocyanate groups of the isocyanato-containing prepolymer are reacted with a modifier. The modifier is preferably added in an amount such that instances of chain extension and thus of molecular weight increase occur. Modifiers used are preferably organic compounds containing hydroxyl and/or secondary and/or primary amino groups, especially polyols with a functionality of two, three and/or more. Examples of polyols which can be used include trimethylolpropane, 1,3,4-butanetriol, glycerol, erythritol, mesoerythritol, arabitol, adonitol, etc. Trimethylolpropane is used with preference.

To prepare the polyurethane resin of the invention it is preferred first to prepare an isocyanato-containing prepolymer from which the desired polyurethane resin is then prepared by further reaction, preferably chain extension. The reaction of the components takes place in accordance with the well-known processes of organic chemistry (cf., e.g., Kunststoff-Handbuch, Volume 7: Polyurethane, edited by Dr. Y. Oertel, Carl Hanser Verlag, Munich, Vienna 1983). Examples of the preparation of the prepolymers are described in DE-A 26 24 442 and DE-A 32 10 051. The polyurethane resins may be prepared by the known methods (e.g., acetone method).

The reaction of the components may take place if desired in the presence of a catalyst, such as organotin compounds and/or tertiary amines.

To prepare the prepolymers, the amounts of the components are chosen such that the equivalents ratio of NCO groups to OH groups is situated between 2.0:1.0 and >1.0:1.0, preferably between 1.4:1 and 1.1:1.

The NCO prepolymer contains at least about 0.5% by weight of isocyanate groups, preferably at least 1% by weight of NCO, based on the solids. The upper limit is approximately 15% by weight, preferably 10% by weight, with particular preference 5% by weight of NCO.

Suitable components (A4) are all water-dilutable binders that are compatible with the other constituents of component (I), examples of such binders being acrylated polyurethane resins and/or polyester acrylates.

In particular, the very particularly preferred component (I) comprises as binders (A)

(A1) at least 20% by weight of at least one polyacrylate resin (A1), (A2) from 0 to 30% by weight of at least one polyester (A2), (A3) from 0 to 80% by weight of at least one polyurethane resin (A3) and (A4) from 0 to 10% by weight of at least one further binder (A4), the sum of the weight fractions of components (A1) to (A4) being in each case 100% by weight.

Besides the inventively essential hydrophobic polyesters and the binders (A), component (I) may include as constituent (D) all customary coatings pigments and/or fillers in fractions of from 0 to 60% by weight, based on component (I). In this context it is possible to use not only the pigments that are common in aqueous coating materials and which do not react with water and/or do not dissolve in water but also the pigments commonly employed in conventional coating materials. The pigments may comprise organic or inorganic compounds and may impart color and/or effect. The coating material of the invention therefore ensures, owing to this large number of appropriate pigments, a universal scope for use of the coating material, and permits the realization of a large number of shades.

As effect pigments (D) it is possible to use metal flake pigments, such as commercially customary aluminum bronzes, aluminum bronzes chromated in accordance with DE-A-36 36 183, and commercially customary stainless steel bronzes, and also nonmetallic effect pigments, such as pearlescent pigments and interference pigments for example. Examples of suitable inorganic color pigments are titanium dioxide, iron oxides, Sicotrans yellow, and carbon black. Examples of suitable organic color pigments are indanthrene blue, Cromophthal red, Irgazine orange and Heliogen green. Examples of suitable fillers are chalk, calcium sulfates, barium sulfate, silicates such as talc or kaolin, silicas, oxides such as aluminum hydroxide or magnesium hydroxide, nanoparticles or organic fillers such as textile fibers, cellulose fibers, polyethylene fibers or wood flour.

As a further constituent (F), component (I) may include at least one organic solvent which may be dilutable in water. Such solvents may also participate in the reaction with the crosslinking component (II) and may therefore act as reactive diluents (E).

Examples of suitable solvents (F) are the compounds already specified in the context of the preparation of the polyacrylate resins (A1) (see above). Also suitable are esters, ketones, keto esters, glycol ethers such as ethylene, propylene or butylene glycol ethers, glycol esters such as ethylene, propylene or butylene glycol esters, or glycol ether esters such as ethoxyethyl propionate and isopropoxypropanol. Further suitable solvents include aliphatic and aromatic solvents such as dipentene, xylene or Shellsol®. The solvents (F) may further consist in whole or in part of low molecular weight oligomeric compounds, which may be unreactive or else reactive toward the crosslinking component (II). Where they are reactive, they comprise reactive diluents (E).

Examples of suitable reactive diluents (E) are described above.

As constituent (G) component (I) comprises, if desired, at least one neutralizing agent.

Examples of suitable neutralizing agents (G) for functional groups (i) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents (G) for functional groups (ii) convertible into anions are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine, and the like. Neutralization may be effected in organic phase or in aqueous phase. Dimethylethanolamine is a preferred neutralizing agent (G) used.

The amount of neutralizing agent (G) used in total in the coating material of the invention is chosen such that from 1 to 100 equivalents, preferably from 50 to 90 equivalents, of the functional groups (i) or (ii) of the binder (A) are neutralized. The neutralizing agent (D) may be added to component (I), (II) and/or (III). Preferably, however, the neutralizing agent (G) is added to component (III).

As constituent (H) component (I) may comprise at least one rheology control additive. Examples of suitable rheology control additives are those known from the patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum magnesium silicates, sodium magnesium phyllosilicates, and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene maleic anhydride copolymers and their derivatives, or hydrophobically modified ethoxylated urethanes or polyacrylates. Preferred rheology control additives used are polyurethanes.

Component (I) may further comprise at least one additional customary coatings additive (H). Examples of such additives (H) are UV absorbers;

free-radical scavengers;

crosslinking catalysts;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes;

adhesion promoters;

leveling agents;

film formation auxiliaries such as cellulose derivatives;

flame retardants, photoinitiators, such as photoinitiators of the Norrish II type, whose mechanism of action is based on an intramolecular variant of the hydrogen abstraction reactions such as occur diversely in the case of photochemical reactions; by way of example, reference may be made here to Römpp Chemie Lexikon, 9th expanded and revised edition, Georg Thieme Verlag Stuttgart, vol. 4, 1991.

Further examples of suitable additives (D) are described in the textbook Lackadditive [Additives for coatings] by Johan Bieleman, Wiley-VCH, Weinheim, New York, 1998.

Of course, said additives (H) may also be added separately to the coating material of the invention. In this case the additives (H) are then referred to as component (IV).

The coating material of the invention may further comprise reactive diluents (E) for the cure with actinic radiation.

Suitable radiation-curable reactive diluents (E) include low molecular weight, polyfunctional, ethylenically unsaturated compounds. Examples of suitable compounds of this kind are esters of acrylic acid with polyols, such as neopentyl glycol diacrylate, trimethylolpropane triacrylate, pentaerythritol triacrylate or pentaerythritol tetraacrylate; or reaction products of hydroxyalkyl acrylates with polyisocyanates, especially aliphatic polyisocyanates.

To prepare the coating material of the invention it is preferred to use components (I) which consist of from 20 to 90% by weight, preferably from 35 to 80% by weight, of the binder (A), especially the polymeric or oligomeric resins (A1), (A2) and/or (A3)

from 1 to 40% by weight, preferably from 3 to 30% by weight, with particular preference from 5 to 25% by weight, and in particular from 10 to 20% by weight of the hydrophobic polyester (C), from 0 to 60% by weight of at least one pigment and/or filler (D), from 0 to 60% by weight of at least one reactive diluent (E) for the thermal cure and, where appropriate, for the cure with actinic radiation, from 0 to 50% by weight, preferably from 10 to 40% by weight, of at least one organic, optionally water-dilutable solvent (F), from 0 to 20% by weight, preferably from 0.1 to 10% by weight, of at least one neutralizing agent (G), from 0 to 30% by weight, preferably from 2 to 20% by weight, of at least one customary auxiliary and/or additive (H) (coatings additive), and from 0 to 80% by weight of at least one of the below-described constituents curable with actinic radiation, the sum of the weight fractions of all constituents being in each case 100% by weight.

The further key constituent of the coating material of the invention is at least one crosslinking agent (B) which is present in component (II).

The crosslinking agents (B) comprise at least one diisocyanate and/or polyisocyanate (B) which if desired is dispersed or dissolved in one or more organic, optionally water-dilutable solvents.

The polyisocyanate component (B) comprises organic polyisocyanates, especially those known as paint polyisocyanates, containing free isocyanate groups attached to aliphatic, cycloaliphatic, araliphatic and/or aromatic moieties. Preference is given to using polyisocyanates containing from 2 to 5 isocyanate groups per molecule and having viscosities of from 100 to 10 000, preferably from 100 to 5 000, and, where manual mixing of components (I), (II) and (III) is envisaged, in particular from 1 00 to 2 000 mPas (at 23° C.). If desired, small amounts of organic solvent may be added to the polyisocyanates, preferably from 1 to 25% by weight based on straight polyisocyanate, in order thus to improve the ease of incorporation of the isocyanate and, where appropriate, to lower the viscosity of the polyisocyanate to a level within the aforementioned ranges. Examples of suitable solvent additives for the polyisocyanates are methoxypropyl acetate or ethoxyethyl propionate, amylmethyl ketone or butyl acetate. Furthermore, the polyisocyanates may have been conventionally hydrophilically or hydrophobically modified.

Examples of suitable polyisocyanates (B) are described by way of example in "Methoden der organischen Chemie", Houben-Weyl, Volume 14/2, 4th Edition, Georg Thieme Verlag, Stuttgart 1963, pages 61 to 70, and by W. Siefken, Liebigs Annalen der Chemie, Volume 562, pages 75 to 136. Suitable examples include the isocyanates specified in the context of the description of the polyurethane resins (A3), and/or isocyanato-containing polyurethane prepolymers which may be prepared by reacting polyols with an excess of polyisocyanates and which are preferably of low viscosity.

Further examples of suitable polyisocyanates (B) are isocyanato-containing polyurethane prepolymers which can be prepared by reacting polyols with an excess of polyisocyanates and are preferably of low viscosity. It is also possible to use polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisooyanate, dicyclohexylmethane 4,4'-diisocyanate or 1,3-bis(isocyanatomethyl)-cyclohexane, diisocyanates derived from dimer fatty acids, as sold under the commercial designation DDI 1410 by Henkel, 1,8-diisocyanato-4-isocyanatomethyl-octane, 1,7-diisocyanato-4-isocyanatomethylheptane or 1-isocyanato-2-(3-isocyanatopropyl)cyclohexane. 1,3-Bis(isocyanatomethyl) cyclohexane, diisocyanates derived from dimer fatty acids, as sold under the commercial designation DDI 1410 by Henkel, 1,8-di-isocyanato-4-isocyanatomethyloctane, 1,7-diisocyanato-4-isocyanatomethylheptane or 1-isocyanato-2-(3-iso-cyanatopropyl)cyclohexane. or mixtures of these poly-isocyanates.

Very particular preference is given to using polyisocyanates (B) containing uretdione and/or isocyanurate and/or allophanate groups, or mixtures of such polyisocyanates (B), based on hexamethylene diisocyanate, as formed by catalytic oligcmerization of hexamethylene diisocyanate using appropriate catalysts. The polyisocyanate constituent may further comprise any desired mixtures of the free polyisocyanates (B) exemplified.

The coating material of the invention may further comprise isocyanato-free crosslinking agents (B'). Depending on their reactivity, these may be present in components (I), (II) and/or (III); the critical factor is that the crosslinking agents (B') do not adversely affect the storage stability of the component in question, such as by premature crosslinking. The skilled worker will therefore be able to select the appropriate combinations of crosslinking agent (B') on the one hand and components (I), (II) and/or (III) on the other in a simple manner.

Examples of suitable crosslinking agents (B') are blocked diisocyanates and/or polyisocyanates based on the aforementioned diisocyanates and/or polyisocyanates (B). Examples of suitable blocking agents are aliphatic, cycloaliphatic or araliphatic monoalcohols such as methyl, butyl, octyl or lauryl alcohol, cyclohexanol or phenylcarbinol; hydroxylamines such as ethanolamine; oximes such as methyl ethyl ketone oxime, acetone oxime or cyclohexanone oxime; amines such as dibutylamine or diisopropylamine; CH-acidic compounds such as malonic diesters or ethyl acetoacetate; heterocycles such as dimethylpyrazol; and/or lactams such as epsilon-caprolactam. Further examples of suitable blocking agents are disclosed in the patent U.S. Pat. No. 4,444,954. These crosslinking agents (B') may be present in components (I), (II) and/or (III).

Further examples of suitable crosslinking agents (B') are polyepoxides (F'), especially all known aliphatic and/or cycloaliphatic and/or aromatic polyepoxides, based for example on bisphenol A or bisphenol F. Examples of suitable polyepoxides (F') also include the polyepoxides available commercially under the designations Epikote® from Shell, and Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether). These crosslinking agents (B') may be present in components (I) and/or (III).

As crosslinking agents (B') it is also possible to use tris(alkoxycarbonylamino)triazines of the formula

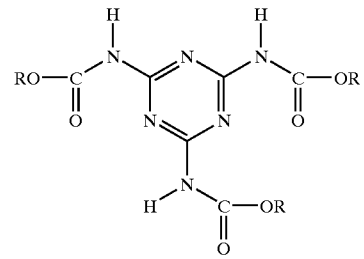

These crosslinking agents (B') may be present in components (I) and/or (III).

Examples of suitable tris(alkoxycarbonylamino)triazines (B') are described in the patents U.S. Pat. No. 4,939,213, U.S. Pat. No. 5,084,541 or EP-A-0 624 577. The tris (methoxy-, tris(butoxy- and/or tris(2-ethylhexoxycarbonylamino)-triazines are used in particular.

The methyl butyl mixed esters, the butyl 2-ethylhexyl mixed esters, and the butyl esters are of advantage. They have the advantage over the straight methyl ester of better solubility in polymer melts, and also have less of a tendency to crystallize.

In particular it is possible to use amino resins, examples being melamine resins, as crosslinking agents (B') . In this context it is possible to use any amino resin suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this type are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207. These crosslinking agents (B') may be present in components (I) and/or (III).

Further examples of suitable crosslinking agents (B') are beta-hydroxylalkylamides such as N,N,N',N'-tetra-kis(2-hydroxyethyl)adipamide or N,N,N',N'-tetrakis-(2-hydroxypropyl)adipamide. These crosslinking agents (B') may be present in components (I) and/or (III).

Further examples of crosslinking agents (B') are polyanhydrides. One example of suitable polyanhydride is polysuccinic anhydride.

Further examples of suitable crosslinking agents (B') are siloxanes, especially siloxanes containing at least one trialkoxy- or dialkoxysilane group. These cross-linking agents (B') may be present in components (I) and/or (II).

The polyisoscyanates (B) are advantageously used in an amount of at least 70% by weight, with particular preference in an amount of from 80 to 100% by weight, based on the overall weight of the crosslinking agents (B) and (B') in the coating material of the invention.

The constituents (F) and (H) of component (I) may also be present in component (II), except that here constituents are used which do not react with isocyanate groups.

To prepare the coating materials of the invention it is preferred to use components (II) which consist of
  (B) from 50 to 100% by weight, preferably from 60 to 90% by weight, of at least one crosslinking agent,
  (F) from 0 to 50% by weight, preferably from 10 to 40% by weight, of at least one organic, optionally water-dilutable solvent, and
  (H) from 0 to 20% by weight, preferably from 0 to 10% by weight, of at least one customary auxiliary and/or additive (coatings additive),
the sum of the weight fractions of constituents being in each case 100% by weight.

The further key constituent of the coating material of the invention is component (III).

In accordance with the invention, this component (III) consists of or comprises water. It is of advantage in accordance with the invention if component (III) includes further suitable constituents in addition to water.

Examples of suitable constituents are the binders (A) described above in detail, the binders (A) especially containing
  (i) functional groups which may be converted into cations by neutralizing agents and/or quarternizing agents, and/or cationic groups
    or
  (ii) functional groups which may be converted into anions by neutralizing agents, and/or anionic groups
    and/or
  (iii) nonionic hydrophilic groups.

Of these, the binders (A1), (A2) and/or (A3) dispersed or dissolved in water are particularly advantageous and are therefore used with particular preference.

Where component (I) comprises binders (A) which are dispersible or soluble in water to only a small extent, or not at all, it is advisable to use in particular the binders (A1), (A2) and/or (A3) dispersed or dissolved in water.

Alternatively, the binders (A) may be in the form of a powder slurry. In this case the further crosslinking agents (B') may be present in the powder slurry particles. Powder slurries are customary and known and are described, for example, in the patents EP-A-0 652 264, U.S. Pat. No. 4,268,542, DE-A-196 13 547 or DE-A-195 18 392.

Furthermore, component (III) may additionally comprise at least one of the above-described reactive diluents (E).

For preparing the coating material of the invention it is very particularly preferred to use components (III) which consist of
  from 20 to 90% by weight, preferably from 30 to 85% by weight, of water,
  from 5 to 80% by weight, preferably from 10 to 60% by weight, of the binder (A), especially the polymeric or oligomeric resins (A1), (A2) and/or (A3), in a form dissolved or dispersed in water,
  from 0 to 20% by weight, preferably from 1 to 10% by weight, of at least one neutralizing agent (G), and
  from 0 to 20% by weight, preferably from 2 to 10% by weight, of at least one customary auxiliary and/or additive (H) (coatings additive),
the sum of the weight fractions of constituents being in each case 100% by weight.

The component (III) comprising the water-dispersed binders (A), especially the water-dispersed binders (A1), (A2) and/or (A3), may on the one hand be prepared by preparing the constituents in organic solvent, then neutralizing the acid groups, especially carboxyl groups, with the neutralizing agent (G) and, finally, introducing the neutralized constituents into deionized water, or on the other hand may be prepared by emulsion polymerization of the monomeric building blocks of the binders (A) in water. Preferably, components (A1), (A2) and/or (A3) are first prepared in organic solvents, then neutralized and, finally, dispersed in water in neutralized form as a secondary dispersion.

In the course of the preparation of the water-dispersed form of the polyacrylate resins (A1), the polymerization in the organic solvent is preferably conducted in a plurality of stages with separate monomer and initiator feeds. With very particular preference, the polyacrylate resin (A1) is prepared by the two-stage process already described above, by
  1. polymerizing a mixture of (a1), (a2), (a4), (a5), and (a6), or a mixture of portions of components (a1), (a2), (a4), (a5), and (a6), in an organic solvent,
  2. after at least 60% by weight of the mixture consisting of (a1), (a2), (a4), (a5), and, where used, (a6) have been added, adding (a3) and any remainder of components (a1), (a2), (a4), (a5), and (a6), and continuing polymerization, and
  3. after the end of the polymerization, subjecting the resulting polyacrylate resin (A1) if des red to at least partial neutralization.

Examples of suitable neutralizing agents (G) as used in step 3. are the ammonia, ammonium salts and amines already described in connection with the preparation of component (I), it being possible for the neutralization to take place in organic phase or in aqueous phase. The total amount of neutralizing agent (G) used to neutralize component (A1) is chosen so that from 1 to 100 equivalents, preferably from 50 to 90 equivalents, of the acid groups of the binder (A1) are neutralized.

Used with preference as constituents (A2) in component (III) are polyesters (A2) which have been prepared by a two-stage process comprising first preparing a hydroxyl-containing polyester having an OH number of from 100 to 300 mg KOH/g, an acid number of less than 10 mg KOH/g, and a number-average molecular weight Mn of from 500 to 2 000 daltons, which is then reacted in a second stage with carboxylic anhydrides to give the desired polyester (A2). The amount of carboxylic anhydrides is chosen such that the resulting polyester has the desired acid number.

After the end of the reaction, the polyester (A2) is subjected to at least partial neutralization, in which case use is again made of the neutralizing agents (G) already described in connection with the preparation of component (I), and where the neutralization may take place in organic phase or in aqueous phase.

To prepare the polyurethane resins (A3) for component (III) it is preferred first to prepare an isocyanato-containing prepolymer from which the polyurethane resin (A3) is then prepared by further reaction, preferably by chain extension.

After the end of the polymerization, the resulting polyurethane resin is subjected to at least partial neutralization, in which case it is again possible to use as suitable neutralizing agent (G) the ammonia, ammonium salts and amines already described in connection with the preparation of component (I), and it is possible for the neutralization to take place in organic phase or in aqueous phase.

Suitable components (A4) which are additionally present where appropriate are all water-dilutable and/or water-dispersible binders that are compatible with the other constituents of component (III), examples of such binders including acrylated polyurethane resins and/or polyester acrylates.

The above-described water-dilutable and/or water-dispersible binders (A), especially the binders (A1), may be dried following their preparation, by spray drying or freeze drying, for example, and stored separately. For the preparation of the coating material of the invention they may be added in particular to component (III) in the form of a finely divided solid component (V).

Furthermore, based on its overall amount, the coating composition of the invention may contain up to 40% by weight of constituents (J) which are curable with actinic light, especially UV radiation, and/or electron beams. These constituents may be present in component (I), (II) and/or (III), especially in component (I). This affords the advantage that the coating compositions of the invention are curable thermally and/or by radiation.

Suitable constituents (J) include in principle all low molecular mass, oligomeric and polymeric compounds that are curable with actinic radiation and/or electron beams, such compounds being those as commonly used in the field of UV curable or electron beam curable coating compositions. These radiation curable coating compositions normally include at least one, preferably two or more, radiation curable binders, based in particular on ethylenically unsaturated prepolymers and/or ethylenically unsaturated oligomers, one or more reactive diluents (E), where appropriate, and one or more photoinitiators (H), where appropriate.

Advantageously, the constituents (J) used are radiation curable binders. Examples of suitable such binders (J) include (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders (N) that are free from aromatic structural units. Preference is therefore given to using urethane (meth)acrylates and/or polyester (meth)acrylates, with particular preference aliphatic urethane acrylates.

To prepare the coating materials of the invention, components (I), (II) and (III), and where appropriate (IV) and (V), are used preferably in amounts such that the equivalents ratio of hydroxyl groups of the binders (A) and of the hydrophobic polyesters (C) for use in accordance with the invention, and where appropriate of the reactive diluents (E) to the crosslinking groups of the crosslinking agent (B) and also, where appropriate, (B') is situated between 1:2 and 2:1, preferably between 1:1.2 and 1:1.5.

Furthermore, the coating materials of the invention preferably comprise in total from 1 to 40% by weight, preferably from 2 to 30% by weight, of inventively essential hydrophobic polyesters (C), from 10 to 70% by weight, preferably from 20 to 60% by weight, of binders (A), from 5 to 40% by weight, preferably from 10 to 30% by weight, of crosslinking agents (B), from 0 to 50% by weight, preferably from 0 to 30% by weight, of pigments and/or fillers (D), from 0 to 30% by weight of reactive diluents (E), from 5 to 25% by weight, preferably from 7 to 20% by weight, of organic solvents (F), from 20 to 60% by weight, preferably from 30 to 50% by weight, of water, from 0 to 10% by weight of customary coatings additives (H), and from 0 to 40% by weight of constituents (J) curable with actinic radiation based in each case on the overall weight of the coating material of the invention.

The preparation of component (I) takes place in accordance with methods known to the skilled worker by mixing and, where appropriate, dispersing of the individual constituents. For example, color pigments (D) are normally incorporated by grinding (dispersing) the respective pigments in one or more binders. The dispersing of the pigments takes place with the aid of customary apparatus, such as bead mills and sand mills, for example.

Components (II), (III) and, where appropriate, (IV) are likewise prepared in accordance with methods well known to the skilled worker, by mixing and/or dispersing of the individual constituents.

The coating materials of the invention are prepared in particular by the following mixing method from components (I), (II), (III) and, where appropriate, (IV) and/or (V):

To prepare the coating materials of the invention, first of all components (I) and (II) are mixed, these components (I) and (II) preferably containing no neutralizing agent (G). Then component (IV), where appropriate, is added to this mixture. Then either the resulting mixture is added to component (III) comprising neutralizing agent (G) and the resulting coating material is mixed in, or component (III) comprising neutralizing agent (G) is added to the resulting mixture.

Furthermore, the coating material of the invention may be prepared in analogy to the process just described, but with the neutralizing agent (G) not present in component (III) but being instead added separately prior to the addition of component (III).

Furthermore, the coating material of the invention may also be prepared by first adding the neutralizing agent (G) to component (I). Instead of this mixing it is of course also possible to use a component (I) which already contains the neutralizing agent (G). The resulting component (I) is then mixed with component (II) and, where appropriate, with component (IV) (simultaneous or successive mixing with (II) and, where appropriate, (IV)), then either the resulting mixture is added to component (III) or component (III) is added to the resulting mixture, and the coating material of the invention thus obtained in each case is homogenized by stirring.

If binders (A) containing exclusively nonionic hydrophilic groups (iii) are used, the use of the neutralizing agents (G) is dispensed with.

The coating materials of the invention may be applied to any desired primed or unprimed substrates by customary application methods, such as spraying, knife coating, brushing, flow coating, dipping or rolling, for example.

The substrates may be of metal, wood, plastic, glass, ceramic or paper or may comprise these materials in the form of composites. Preferably, the substrates are automobile body parts or industrial components including containers, made of metal, or comprise furniture.

The substrate may have been provided with a primer. In the case of plastics, the primer in question is what is known as a hydroprimer, which is cured before the coating material of the invention, particularly the aqueous basecoat material or clearcoat material, is applied. In the case of metals, especially automobile body parts, the primer in question comprises customary and known cured electrocoats, to which a primer-surfacer is applied and baked.

When used in automotive refinish, the coating materials of the invention are cured commonly at temperatures of below 120° C., preferably at temperatures of not more than 80° C. When used in automotive OEM finishing, higher curing temperatures are also employed.

Where the coating materials of the invention may also comprise constituents (J) curable with actinic radiation, they may additionally be cured, in a customary and known manner, with UV light or electron beams.

For curing it is possible to employ the customary and known methods such as a heating in a forced air oven, irradiation with IR lamps and, where appropriate, with UV lamps.

The coating materials of the invention are therefore outstandingly suitable for the production of single-coat or multicoat clear or pigmented coating systems for automotive OEM finishing and automotive refinish, for industrial coating, including coil coating and container coating, for the coating of plastics, and for furniture coating. In particular, the coating materials of the invention are used as clearcoat materials, aqueous basecoat materials, solid-color topcoat materials or primers or primer-surfacers in automotive OEM finishing or automotive refinish.

Where multicoat paint systems are produced, the coating materials of the invention may be applied with advantage by the wet-on-wet technique (basecoat-clearcoat process) both as basecoat material and as clearcoat material.

EXAMPLES AND COMPARATIVE EXPERIMENT C1

Preparation Example 1

The Preparation of a Polyacrylate Resin 1

402.7 parts by weight of ethoxyethyl propionate (EEP) were weighed into a steel reactor suitable for polymerization and equipped with monomer feed, initiator feed, temperature measurement means, oil heating and reflux condenser, and were heated to 130° C. A mixture of 50 parts by weight of styrene, 20.5 parts by weight of methyl methacrylate, 26.6 parts by weight of lauryl methacrylate, 56.9 parts by weight of hydroxyethyl acrylate, 41.4 parts by weight of tert-butyl acrylate and 46.1 parts by weight of butyl methacrylate was metered in at a uniform rate with stirring over the course of two and a half hours. The initiator feed was started at the same time as this feed. The initiator solution (21.2 parts by weight of tert-butyl peroxyethylhexanoate in 34.6 parts by weight of EEP) was metered in to the reaction mixture at a uniform rate in parallel with the first feed. Thereafter the reaction mixture was heated at 130° C. for one hour. Subsequently, at 130° C., a monomer mixture of 30 parts by weight of styrene, 12.3 parts by weight of methyl methacrylate, 16 parts by weight of lauryl methacrylate, 72.3 parts by weight of hydroxyethyl acrylate, 27.6 parts by weight of butyl methacrylate, 24.9 parts by weight of tert-butyl acrylate and 18.3 parts by weight of acrylic acid was metered in over the course of one and a half hours. At the same time the feed of an initiator mixture of 25.7 parts by weight of EEP and 15.7 parts by weight of tert-butyl peroxyethylhexanoate was commenced. The initiator feed was continued for two hours.

Subsequently the reaction mixture was heated at 130° C. for two hours, after which EEP was distilled off under reduced pressure at 100° C. until a solids content of 80% by weight was reached. Following the addition of 40.2 parts by weight of butyl glycol at 60° C., the solids content was adjusted to 75% by weight using EEP.

This gave the polyacrylate resin 1 with an acid number of 30 mg KOH/g and a viscosity of 3.5 dPas (55% in EEP).

Preparation Example 2

The Preparation of a Polyester Resin Precursor 2

A steel reactor suitable for polycondensation reactions was charged with 297.2 parts by weight of neopentyl glycol hydroxypivalate, 32.8 parts by weight of phthalic anhydride, 346.4 parts by weight of isophthalic acid, 5.7 parts by weight of 2-butyl-2-ethyl-1,3-propanediol, 133.5 of neopentyl glycol and 11.2 parts by weight of cyclohexane. This initial charge was then heated and the water of condensation was removed continuously until an acid number of 3.5 mg KOH/g was reached. Thereafter the reaction mixture was cooled to 60° C. and a solids content of 80% by weight was set using methyl ethyl ketone. The viscosity of the resulting polyester resin 2 was 3.5 dPas (23° C., 60% in EEP).

Preparation Example 3

The Preparation of a Water-dispersed Polyurethane Resin 3

A steel reactor suitable for polyurethane resin synthesis was charged with 264.7 parts by weight of the polyester resin precursor from preparation example 2, 2.3 parts by weight of butyl-2-ethyl-1,3-propanediol, 24.4 parts by weight of dimethylolpropionic acid and 112.4 parts by weight of m-tetramethylxylylene diisocyanate and this initial charge was left to react at a product temperature of 82° C. until a constant isocyanate content was reached. Then 36.2 parts by weight of trimethylolpropane were added in one portion and heating was continued until the reaction had ended. Subsequently, 44.5 parts by weight of methyl ethyl ketone were added. After stirring for 30 minutes, the product was neutralized with 13 parts by weight of dimethylethanolamine. The resultant polyurethane resin was dispersed in 480 parts by weight of deionized water whose temperature was 60° C. Subsequently, the methyl ethyl ketone was distilled off under reduced pressure. The resultant polyurethane dispersion was adjusted to a solids content of 40% by weight using deionized water. The resultant dispersion was free from gel particles, was homogeneous, and had an acid number of 30 mg KOH/g resin solids and a pH of 7.2.

Preparation Example 4

The Preparation of a Polyacrylate Resin Dispersion 4

94 parts by weight of methyl isobutyl ketone were weighed into a steel reactor suitable for polymerization and equipped with monomer feed, initiator feed, temperature measurement means, oil heating and reflux condenser, and were heated to 110° C. A mixture of 32.9 parts by weight of styrene, 38.3 parts by weight of methyl methacrylate, 22.0 parts by weight of lauryl methacrylate, 49.5 parts by weight of hydroxyethyl acrylate and 43.9 parts by weight of butyl methacrylate was metered in at a uniform rate with stirring over the course of three hours. The initiator feed was started at the same time as this feed. The initiator solution (11.3 parts by weight of tert-butyl peroxyethylhexanoate in 25.8 parts by weight of methyl isobutyl ketone) was metered in to the reaction mixture at a uniform rate in parallel with the first feed. Thereafter the reaction mixture was heated at 110° C. for one hour.

Subsequently, at 110° C., a monomer mixture of 14.1 parts by weight of styrene, 16.4 parts by weight of methyl methacrylate, 9.4 parts by weight of lauryl methacrylate, 52.4 parts by weight of hydroxyethyl methacrylate, 18.8 parts by weight of butyl methacrylate and 15.9 parts by weight of acrylic acid was metered in over the course of one and a half hours.

At the same time the feed of an initiator mixture of 16.6 parts by weight of methyl isobutyl ketone and 7.5 parts by weight of tert-butyl peroxyethylhexanoate was commenced. The initiator feed was continued for two hours.

Subsequently the reaction mixture was heated at 110° C. for two hours. After this time, 17.5 parts by weight of dimethylethanolamine were added. The resulting reaction mixture was dispersed at 80° C. in 149.5 parts by weight of deionized water and held at 80° C. for one hour. Then 330 parts by weight of deionized water were added and the methyl isobutyl ketone was distilled off under reduced pressure.

The resulting polyacrylate resin dispersion 4 was adjusted to a solids content of 40% by weight using deionized water. It had an acid number of 40 mg KOH/g resin solids at a pH of 7.5.

Preparation Example 5

The Preparation of a Hydrophobic Polyester 5 for Inventive Use

In a steel reactor, 308 parts by weight of hexahydrophthalic anhydride and 134 parts by weight of trimethylolpropane were weighed in and heated to 150° C. Thereafter, 457 parts by weight of Versatic acid® glycidyl ester (Cardura® E 10) were metered in at a uniform rate over the course of one hour. The reaction mixture was held at 150° C. until an acid number <3 mg KOH/g was reached. The resulting polyester 5 was adjusted to a solids content of 80% by weight at 120° C., using butyl glycol acetate. The viscosity of the dilution was 28 dPas.

Preparation Example 6

The Preparation of a Hydrophobic Polyester 6 for Inventive Use

One mole of malic acid was reacted with two moles of Versatic acid® glycidyl ester (Cardura® E 10) until an acid number <3 mg KOH/g was reached. The resulting malic ester 6 was mixed with butyl glycol acetate to give an 80% by weight dilution.

Example 1

Preparation and Use of the Inventive Coating Material 1

1.1 The Preparation of Component (I)

To prepare component (I), the following constituents were mixed with one another using a stirrer (600 rpm): 58.0 parts by weight of the polyacrylate resin 1 from preparation example 1, 16 parts by weight of the hydrophobic polyester 5 from preparation example 5, 11.5 parts by weight of butyl glycol acetate 2.4 parts by weight of EEP, 7.5 parts by weight of a commercial wetting agent (Tensid S from Biesterfeld, 50% in butyl glycol), 1 part by weight of a leveling agent based on a polyether-modified dimethylsiloxane copolymer (Byk® 331 from Byk Gulden), 0.8 part by weight of a commercial HALS light stabilizer (Tinuvin® 292 from Ciba), and 0.8 part by weight of a commercial UV absorber (Tinuvin® 1130 from Ciba).

1.2 The Preparation of Component (II)

To prepare component (II), 51.2 parts by weight of Desmodur® VPLS 2025/1 (trimeric polyisocyanate based on hexamethylene diisocyanate, from Bayer), 15.3 parts by weight of Desmodur® VPLS 2102 (polyisocyanate based on hexamethylene diisocyanate allophanate, from Bayer) and 33.5 parts by weight of butyl glycol acetate were mixed with one another.

1.3 The Preparation of Component (III)

To prepare component (III), 37.9 parts by weight of deionized water, 0.2 parts by weight of dimethylethanolamine, 1.5 parts by weight of butyl glycol, and 0.4 part by weight of a commercial thickener based on polyurethane (Dapral® T210), 20 parts by weight of the polyacrylate resin dispersion 4 from preparation example 4 and 40 parts by weight of the polyurethane resin dispersion 3 from preparation example 3 were mixed with one another, with stirring.

1.4 The Preparation of an Inventive Clearcoat Material

To prepare the inventive clearcoat material, 25 parts by weight of component (II) were stirred by hand into 25 parts by weight of component (I).

The resulting mixture (I/II) was stirred into 50 parts by weight of component (III). This was done using a stirrer. The resulting inventive clearcoat material 1.4 was adjusted to spray viscosity by adding 25 parts by weight of deionized water.

1.5 The Production of Inventive Coatings and Test Panels

Phosphated steel panels which had been coated conventionally with a commercially customary electrocoat material and a commercially customary primer-surfacer were coated with an aqueous basecoat material in accordance with the European patent specification EP-A-0 279 813 in a thickness of from 12 to 15 μm. The aqueous basecoat material was predried at room temperature for five minutes and at 60° C. for 10 minutes. Thereafter the inventive clearcoat material was applied to the aqueous basecoat film in two spray passes with a flash-off time of three to four minutes in between.

The resulting coating films were flashed off at room temperature for 10 minutes and dried in a forced air oven at 60° C. for 45 minutes. The multicoat paint systems thus obtained had outstanding performance properties. The results of the relevant investigations can be found in the table.

The gloss was measured at 20° C. and the gray haze was measured in accordance with DIN 67530 using the Microglass Haze haze meter from Byk-Gardner.

Example 2

Preparation and Use of the Inventive Coating Material 2

Example 1 was repeated except that this time the hydrophobic polyester 5 from preparation example 5 was present not in component (I) but instead in component (III). The same outstanding performance properties were obtained as in the case of example 1.

Example 3

Preparation and Use of the Inventive Coating Material 3

Example 1 was repeated except that the hydrophobic polyester 6 from preparation example 6 was used instead of the hydrophobic polyester 5 from preparation example 5 used in example 1. The same advantageous results were obtained as in the case of example 1.

Example 4

Preparation and Use of the Inventive Coating Material 4

Example 2 was repeated except that this time the hydrophobic polyester 6 from preparation example 6 was present not in component (I) but instead in component (III). The same outstanding performance properties were obtained as in the case of example 1.

Comparative Experiment C1

Preparation of the Noninventive Coating Material C1

Example 1 was repeated except that no hydrophobic polyester for inventive use was used and instead of component (I) of example 1 the following component (I) was used:

74 parts by weight of the polyacrylate resin 1 from preparation example 1, 10 parts by weight of butyl glycol acetate 5.9 parts by weight of EEP, 7.5 parts by weight of a commercial wetting agent (Tensid S from Biesterfeld, 50% in butyl glycol), 1 part by weight of a leveling agent based on a polyether-modified dimethylsiloxane copolymer (Byk® 331 from Byk Gulden), 0.8 part by weight of a commercial HALS light stabilizer (Tinuvin® 292 from Ciba), and 0.8 part by weight of a commercial UV absorber (Tinuvin® 1130 from Ciba).

The test results obtained are compared in the table with those of example 1. The comparison demonstrates the advantageous nature of the coating material of the invention.
Table: Performance Properties of the Inventive Coating Material 1 from Example 1 and of the Noninventive Coating Material C1 from Comparative Experiment C1

| Property | Example 1 | Comparative experiment C1 |
|---|---|---|
| Gloss | 88 | 87 |
| Haze | 9.8 | 11.5 |
| Film thickness ($\mu$m) | 50 | 50 |
| Popping limit (wedge panel) Drying: 45 minutes, 60° C. | 75 $\mu$m | 50 $\mu$m |
| Drying: room temperature, 12 hours | 100 $\mu$m | 75 $\mu$m |
| Visual impression | Very clear | clear |
| Leveling (visual) | Very good | good |

What is claimed is:

1. A coating material comprising (I) a component comprising at least one oligomeric or polymeric resin containing functional groups which react with isocyanate groups, as binder (A), (II) a component comprising at least one polyisocyanate as crosslinking agent (B), and (III) a component which comprises water, wherein at least one of component (I) or (III) comprise at least one substantially unbranched, hydrophobic polyester (C) comprising at least two hydroxyl groups in the molecule, an OH number of from 56 to 500 mg KOH/g, an acid number <10 mg KOH/g and a number-average molecular weight Mn of from 300 to 2 000 daltons wherein the substantially unbranched, hydrophobic polyester has the general formula 1.

$$[R^1—CH(OH)—CH_2—OOC—]_2R \qquad (1)$$

wherein:

R=substituted or unsubstituted divalent $C_1$ to $C_{20}$ alkanediyl, $C_2$ to $C_{20}$ alkenediyl, $C_4$ to $C_{20}$ cycloalkanediyl or cycloalkenediyl, $C_6$ to $C_{12}$ arylidene, divalent $C_6$ to $C_{20}$ arylalkyl, arylalkenyl, arylcycloalkyl or arylcycloalkenyl radical; or substituted or unsubstituted divalent aliphatic, cycloaliphatic, acyclic or cyclic olefinically unsaturated, aromatic, aliphatic-aromatic, cycloaliphatic-aromatic, acyclic unsaturated aromatic or cyclic unsaturated aromatic radical which contains at least one carboxylic ester group;

R1=hydrogen atom or monovalent substituted or unsubstituted C1 to C20 alkyl, C2 to C20 alkenyl, C4 to C12 cycloalkyl or cycloalkenyl, C6 to C12 aryl or C6 to C20 arylalkyl, arylalkenyl, arylcycloalkyl, arylcycloalkenyl, alkylaryl, alkenylaryl, cycloalkylaryl, cycloalkenylaryl, alkylcycloalkyl, alkylcycloalkenyl, alkenylcycloalkyl, alkenylcycloalkenyl, cycloalkylalkyl, cycloalkenylalkyl, cycloalkylalkenyl or cycloalkenylalkenyl radical.

2. The coating material of claim 1, wherein radical R comprises at least one hydroxyl group.

3. The coating material of claim 1, wherein radical $R^1$ is substituted by at least one substituent selected from —F, —Cl, —Br, —I, —CN, —NO2, —OH, —OR², —SH, —SR², —NH2, —NHR², —N(NR²)2, —OOC—R², and mixtures thereof, and R²=monovalent substituted or unsubstituted C1 to C20 alkyl, C2 to C20 alkenyl, C4 to C12 cycloalkyl or cycloalkenyl, C6 to C12 aryl or C6 to C20 arylalkyl, arylalkenyl, arylcycloalkyl, arylcycloalkenyl, alkylaryl, alkenylaryl, cycloalkylaryl, cycloalkenylaryl, alkylcycloalkyl, alkylcycloalkenyl, alkenylcycloalkyl, alkenylcycloalkenyl, cycloalkylalkyl, cycloalkenylalkyl, cycloalkylalkenyl or cycloalkenylalkenyl radical.

4. The coating material of claim 1, wherein radical $R^1$ is a methyl group which is monosubstituted by —OOC—$R^2$, radical $R^2$ being a branched $C_4$ to $C_{12}$ alkyl radical.

5. The coating material of claim 1, wherein the functional groups which react with isocyanate groups are hydroxyl groups.

6. The coating material of claim 1, wherein component (III) comprises at least one binder (A).

7. The coating material of clam 1, wherein at least one of components (I) and (II) comprises at least one binder (A) which is dispersible or soluble in water.

8. The coating material of claim 7, wherein binder (A) comprises at least one functional group selected from (i) functional groups which may be converted into cations by neutralizing agents and/or quarternizing agents, and/or cationic groups, (ii) functional groups which may be converted into anions by neutralizing agents, and/or anionic groups, (iii) nonionic hydrophilic groups.

9. The coating material of claim 8, wherein binders (A) comprise at least one functional group selected from (i)sulfonium groups, (ii)carboxylic acid and/or carboxylate groups, and (iii)poly(alkylene ether) groups.

10. The coating material of claim 9, characterized in that the binder (A) comprises at least one functional group (ii) selected from carboxylic acid groups, carboxylate groups, and mixtures thereof.

11. The coating material of claim 6, characterized in that in component (III) at least a portion of binder (A) is present as powder slurry particles.

12. The coating material of claim 1, characterized in that at least one of components (I), (II) and (III) comprise as further crosslinking agent (B') at least one crosslinking agent selected from epoxide compounds comprising at least two epoxide groups per molecule, amino resins, blocked polyisocyanates, tris(alkoxy-carbonylamino)triazines, siloxanes, polyanhydrides, beta-hydroxyalkylamides, and mixtures thereof.

13. The coating material of claim 1, further comprising (V) a finely divided solid component comprising at least one water-soluble or dispersible, finely divided solid binder (A).

14. The coating material of claim 1, wherein the polyester (C) is made by reacting hydroxydicarboxylic acids with epoxides.

15. The coating material of claim 1, wherein the polyester (C) is made by reacting dicarboxylic acids with one or more polyols selected from diols, triols, tetrols, and mixtures thereof, and reacting the resultant polyesters with epoxides.

16. The coating material of claim 15, characterized in that the molar ratio of hydroxyl groups to carboxyl groups in the case of the diols is 1.0, in the case of the triols is 1.5 and in the case of the tetrols is 2.0.

17. A process of coating a substrate, comprising applying to a substrate the coating material of claim 1.

18. The process of claim 17 wherein the applied coating material is at least one coating selected from aqueous coatings, clearcoat coatings, basecoat coatings, primer coatings, topcoat coatings, and mixtures thereof.

19. The coating material of claim 7, wherein both of components (I) and (II) comprise at least one binder (A) which is dispersible or soluble in water.

20. The coating material of claim 10 or 11, wherein at least one of component (I) and (III) comprise at least one binder (A) selected from (A1) an acrylate copolymer (A1) which is dispersible or soluble in at least one organic solvents, comprises hydroxyl groups, at least one functional group selected from carboxylic acid groups, carboxylate groups, and mixtures thereof, and has a number-average molecular weight Mn of between 1000 and 30000 daltons, an OH number of from 40 to 200 mg KOH/g and an acid number of from 5 to 150 mg KOH/g, (A2) a hydrophilic water-dispersible polyester resin (A2) which is dispersible or soluble in at least one organic solvents, comprises hydroxyl groups, at least one functional group selected from carboxylic acid groups, carboxylate groups, and mixtures thereof, and has a number-average molecular weight Mn of between 1 000 and 30 000 daltons, an OH number of from 30 to 250 mg KOH/g and an acid number of from 15 to 150 mg KOH/g, (A3) a polyurethane resin (A3) which is dispersible or soluble in at least one organic solvents, comprises hydroxyl groups, at least one functional group selected from carboxylic acid groups, carboxylate groups, and mixtures thereof, and has a number-average molecular weight of between 1 000 and 30 000 daltons, an OH number of from 20 to 200 mg KOH/g and an acid number of from 5 to 150 mg KOH/g, and mixtures thereof.

* * * * *